United States Patent
Douglas et al.

(10) Patent No.: US 7,769,676 B2
(45) Date of Patent: Aug. 3, 2010

(54) EXCHANGE OFFER FOR SECURITIES

(76) Inventors: Peter R. Douglas, 542 Broadway, Apt. 6, New York, NY (US) 10012; Bruce K. Dallas, 26530 Weston Dr., Los Altos Hills, CA (US) 94022; Daniel Simkowitz, 1172 Park Ave., New York, NY (US) 10128; David A. Sullivan, 260 W. 52nd St., Apt. 6C, New York, NY (US) 10019; Trevor R. Burgess, Duke's Mews, London (GB) W1V3ET ( * ) Notice: Subject to any disclaimer, the term of this patent is extended or adjusted under 35 U.S.C. 154(b) by 295 days.

(21) Appl. No.: 11/903,789

(22) Filed: Sep. 25, 2007

(65) Prior Publication Data

US 2008/0249923 A1 Oct. 9, 2008

Related U.S. Application Data

(60) Provisional application No. 60/827,578, filed on Sep. 29, 2006.

(51) Int. Cl.
G06Q 40/00 (2006.01)
G06Q 30/00 (2006.01)

(52) U.S. Cl. ................ 705/37; 705/26; 705/36

(58) Field of Classification Search .............. 705/26, 705/36, 37; 707/10
See application file for complete search history.

(56) References Cited

U.S. PATENT DOCUMENTS 3,705,384 A * 12/1972 Wahlberg ............... 705/5
7,444,300 B1 * 10/2008 Broms et al. ............ 705/35
7,565,313 B2 * 7/2009 Waelbroeck et al. ...... 705/37
2002/0133443 A1 * 9/2002 Seaman ................. 705/36
2002/0194107 A1 * 12/2002 Li et al. ................ 705/37
2003/0177126 A1 * 9/2003 Weingard et al. ........ 707/10
2004/0236636 A1 * 11/2004 Lutnick et al. .......... 705/26
2004/0267655 A1 * 12/2004 Davidowitz et al. ...... 705/37
2005/0149426 A1 * 7/2005 Jokisch et al. .......... 705/37
2005/0228735 A1 * 10/2005 Duquette ............... 705/37
2008/0249923 A1 * 10/2008 Douglas et al. ......... 705/37

FOREIGN PATENT DOCUMENTS

EP 1445719 * 11/2004
WO WO 01/07986 * 2/2001

(Continued)

OTHER PUBLICATIONS

Anonymous, McDonald's/Chipotle Stock Exchange Oversubscribed, Restaurant News, QSR Magazine, [Oct. 6, 2006], pp. 1-2.*

(Continued)

Primary Examiner—James P Trammell
Assistant Examiner—B. Joan Amelunxen
(74) Attorney, Agent, or Firm—K&L Gates LLP

(57) ABSTRACT

An exchange offer for securities where the exchange ratio is determined at or shortly after the end of the initial tender period. The exchange ratio can be determined based on a formula using trading data (and/or other variables) for the involved or other securities over a look-back period that covers the end or final portion of the tender period.

34 Claims, 2 Drawing Sheets

FOREIGN PATENT DOCUMENTS

| | | | |
|---|---|---|---|
| WO | WO 02/19218 | * | 3/2001 |
| WO | WO 02/19218 | * | 3/2002 |

OTHER PUBLICATIONS

Willkie Farr & Gallagher, LLP, Client Memorandum, SEC amends safe harbor for issuer stock repurchases and adopts disclosure requirements for issuer stock repurchases, New York, NY [Dec. 8, 2003].*

Securities and Exchange Commission Form S-4, Chipolte Mexican Grill, Inc., Sep. 7, 2006.

Letter dated Sep. 27, 2006 from J. Fisher to Office of Mergers and Acquisitions, Division of Corporate Finance, Securities and Exchange Commission.

Letter dated Mar. 21, 2007 from C. Arntzen to Office of Mergers and Acquisitions, Division of Corporate Finance, Securities and Exchange Commission.

TXU Corporation, SEC No-Action letter, 2004 SEC No-Act. Lexis 734, (2004).

Microsoft Corporation, SEC No-Action letter, 2003 WL 22358818 (S.E.C. No—Action Letter), (2003).

Epicor Software Corporation, SEC No-Action letter, 2004 WL 1126018 (S.E.C. No—Action Letter), (2004).

Lazard Freres & Co., SEC No-Action letter, 1995 SEC No-Act. Lexis 634, (1995).

AB Volvo, SEC No-Action letter, 1997 SEC No-Act. Lexis 1050, (1997).

* cited by examiner

EXCHANGE OFFER FOR SECURITIES

PRIORITY CLAIM

This application claims priority to provisional application Ser. No. 60/827,578, entitled "Exchange Offer For Securities" by Peter R. Douglas, et al., filed Sep. 29, 2006, which is hereby incorporated by reference.

BACKGROUND

An exchange offer is an offer by an entity to exchange one security for another security according to an exchange ratio. In such offers, for example, a party holding a first security may offer units of the first security to investors holding a second security in exchange for units of the second security, where the number of units of the first security the investors receive in the exchange is based on the exchange ratio. Typically, the investors have a tender period over which to decide whether to submit some or all of their securities for exchange, and some or all of the tendered securities may be accepted in the offer by the offering party.

Exchange offers using a fixed exchange ratio that is established at the inception of the tender period are known. For example, a first party may offer one unit of a first security for two units of the second security, such that the ratio of the first security to the second security is always one to two. Typically, for legal and other reasons, there is a minimum amount of time given to investors to consider the exchange offer (e.g., 20 business days). Typically, the fixed exchange ratio would provide the holders of the second security an economic incentive to participate in the exchange offer. For example, assuming at inception, or immediately prior thereto, the first security is valued at $100/share and the second security at $50/share. The first party may offer to exchange one unit of the first security for every 1.8 units of the second security, thereby providing a discount of $10/unit of the first security exchanged. In such fixed-ratio offers, the return to investors depends on the value at offer expiration of both what is offered (e.g., first security) and what is tendered (e.g., second security). Sophisticated investors may seek to lock in the discount at the offer's inception through a variety of trading strategies (such as a long-short arbitrage strategy) that, when implemented, could make them economically indifferent to subsequent changes in the trading price for the securities involved over the tender period. Less sophisticated investors may not pursue such trading strategies. As a result, their participation decision may be more heavily influenced by the relative prices of each security at the offer's end, which may not reflect the discount originally provided.

For various reasons, including to mitigate disadvantages of fixed-ratio offers and to permit a more current market valuation of the securities involved in the exchange, exchange offers have been employed in the past where the exchange ratio was based on a formula using trading data over a specified time period (e.g., ten trading days). In such offerings, however, the final exchange ratio was required to be set two or more full trading days preceding the offer expiration. In such formula-based exchange ratios, the exchange ratio is sometimes based on the volume-weighted average trading price ("VWAP") of the securities involved.

While such formula-based exchange ratios provide benefits to traditional fixed-ratio offers, the values of the securities involved may still fluctuate without limit during the trading interval after the exchange ratio is set but before the offer expires. During that trading interval, sophisticated investors may take steps, as they might do in traditional fixed-ratio offers, to lock in the value embedded in the exchange ratio, whereas less sophisticated investors may lack the know-how or means to do the same.

SUMMARY OF THE INVENTION

In one general aspect, the present invention is directed to an exchange offer for securities where the exchange ratio is determined at or shortly before the end of the initial tender period (e.g., the originally established period of time over which investors can tender their shares pursuant to the exchange offer). Also, the exchange ratio can be determined based on a formula using trading data (and/or other variables) for the involved securities over a look-back period that covers the end or final portion of the tender period. The exchange ratio may be designed to provide a specified dollar value for one security (e.g., the security being offered by the offering party) in exchange for a fixed dollar value of a second security (e.g., the security being tendered by investors). In other embodiments, instead of using the trading data of the involved securities in setting the exchange ratio, the formula may be based on trading data for one or more other securities that may act as a proxy for one of the involved securities. For example, if one of the securities is not publicly traded, a different security that is publicly traded may be used as a proxy for the non-traded security. If a proxy security is used to set the formula, the proxy security preferably has an economic value similar to the economic value of the non-traded security that is part of the exchange. For example, the proxy security may have a unit price which closely tracks the movement of at least one of the first security and the second security. Also, different variables for the securities may be used to establish the non-traded security's value.

According to various embodiments, there may be a limit on the maximum number of units of the first security that an investor can receive for each unit of the second security tendered, or a minimum number of units of the first security that the investor can receive for each unit of the second security tendered, or both a maximum limit and a minimum. The issuer may announce whether the limit on the number of units that can be received for each tendered unit is in effect at or immediately prior to expiration of the originally contemplated tender period expiration date. If the limit applies, then the exchange ratio will be set based on the limit and the exchange offer may be extended for an additional period of time (e.g., two trading days) to permit investors to tender or withdraw their units during this time period.

In another general aspect, the present invention is directed to a computer system that computes the value of the exchange ratio.

FIGURES

Embodiments of the present invention are described herein by way of example in conjunction with the following figures, wherein.

DETAILED DESCRIPTION OF THE INVENTION

Figure 1:
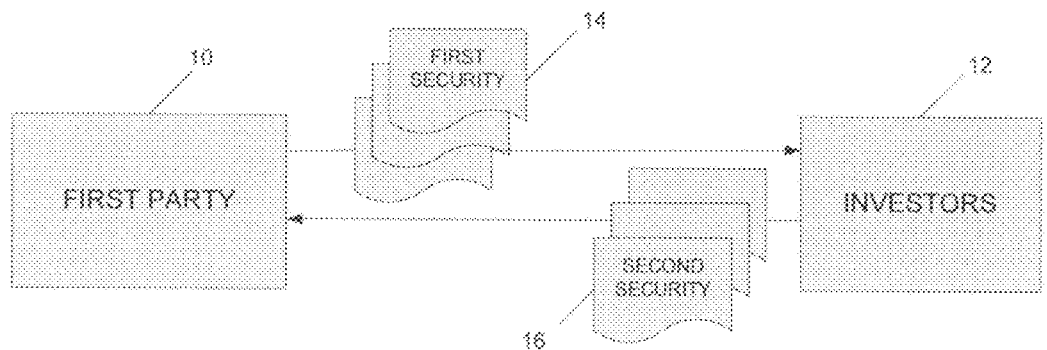
FIG. 1 illustrates a transaction structure for an exchange offer by a first party to an investor in accordance with one embodiment of the present invention.

In one general aspect, the present invention is directed to a process of transacting an exchange offer. According to various embodiments, as shown in FIG. 1, a first party 10 may exchange units (e.g., shares) of a first security 14 for units (e.g., shares) of a second security 16 with investors 12 (e.g., holders of the second security 16) who decide to tender their shares of the second security 16 in the exchange offer. As shown in the timing diagram of FIG. 2, the investors 12 may have a period of time (the "tender period" 20) to decide whether to tender some or all of their shares of the second security 16. The tender period 20 is the originally established period of time over which investors 12 can tender their shares pursuant to the exchange offer. According to embodiments of the present invention, the exchange ratio for the offer may be determined at or near the end of the tender period 20. The tender period 20 may be, for example, twenty business days or some other period of time. The securities may be stocks, bonds, convertible instruments, options, warrants, etc. Also, the second security 16 may be a security previously issued by the first party 10.

Figure 2:
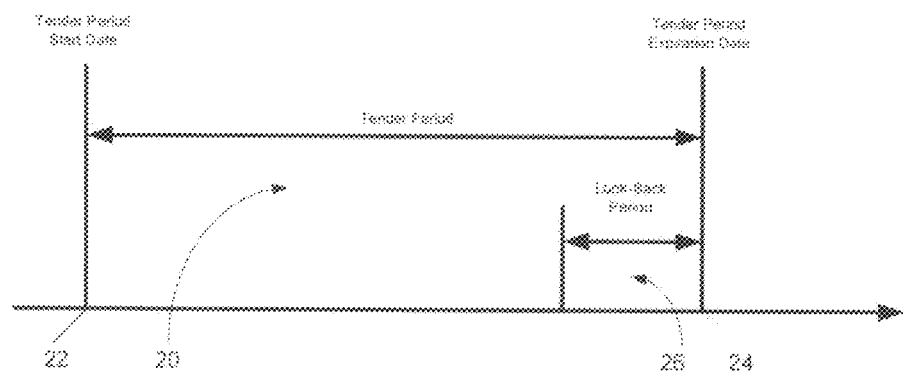
FIG. 2 is a timeline illustrating the exchange offer according to one embodiment of the present invention.

According to various embodiments of the present invention, the exchange ratio may be determined based on a formula using trading data (and/or other variables) for the first security 14 and the second security 16, or proxies for either the first security 14 or the second security 16, over a look-back period 26 that covers the end, or final portion, of the tender period 20, as shown in FIG. 2.

A proxy security may be used for a security which is not publicly traded. A security which has economic value similar to the economic value of the non-traded security may be selected as the proxy security. For example, the proxy security may have a unit price which closely tracks the movement of either the first security or the second security. Also, different variables of the securities may be used to establish the non-traded security's value, such as (i) spread over treasury rates to establish interest rates on debt securities, (ii) dividend rates on preferred stock, or (iii) trading data for common stock (including price and volatility) to establish conversion price or ratio in convertible debt securities or convertible preferred stock.

The exchange ratio may be designed, for example, to realize a dollar parity exchange (i.e., designed to deliver a specified dollar value of the first security in exchange for a fixed dollar value of the tendered second security). For example, the exchange ratio may be designed to realize a fixed dollar value exchange (e.g., $1.00 worth of the first security for $1.11 worth of the second security) or to build in a desired premium or discount for one of the securities. The first party 10 may specify a particular desired dollar parity exchange value for the exchange offer in a prospectus or other offering document for the offering.

Referring to FIG. 2, the tender period 20 begins at the tender period start date 22 and ends at the tender period expiration date 24. According to various embodiments, the exchange ratio may be based on trading data for the exchanged securities or the proxy securities over a specified look-back period 26 over a final portion of the tender period 20. For example, the tender period 20 may be twenty business days and the look-back period 26 over which the trading data for the securities is used to determine the exchange ratio may be the last two trading (or business) days of the tender period 20. In other embodiments, of course, the look-back period 26 may be more or less than two full trading days and the tender period 20 may be more or less than twenty business days, so long as the look-back portion covers the final (or end) portion of the tender period 20 and is preferably shorter in duration than the duration of the tender period 20.

The duration of the look-back period 26 may be designed to reflect the current prices of the securities at the end of the tender period 20. For example, the look-back period 26 could be relatively short (e.g., two trading days) to decrease the likelihood that market-wide fluctuations may influence the calculation and that the prices of the securities involved at the end of the look-back period differ significantly from the value ascribed to them by the pricing mechanism. In another embodiment, a longer look-back period 26 (e.g., ten days) could be used and weights could be applied to the data for each day, with the latter days weighted more heavily than the earlier days, for example. Generally, using a relatively short look-back (or "pricing") period or a look-back period weighted at the end of the tender period may provide additional protection against the manipulation that could arise using "point in time" pricing (e.g., closing prices). However, a spot price (such as the closing price at the end of the tender period 20) could also be used in establishing the exchange ratio in such an embodiment.

Thus, in several embodiments, the exchange ratio is set at or near the tender period expiration date 24. The exchange ratio may be set at or near the tender period expiration date 24 but, in certain embodiments, may not be set prior to the tender period expiration date. For example, the exchange ratio can be set on the tender period expiration date 24 or within a short time prior to the tender period expiration date 24. For example, the exchange ratio may be established at 4 p.m. on the final day of the tender period, and holders of the second security 16 may have until midnight on the final day of the tender period 20 to tender their shares, if any, of the second security 16.

The first party 10 may seek to exchange units of the first security 14 for units of the second security 16 according to dollar parity pricing model. For example, the units of the first security 14 may be exchanged at a discount on the per-share value of the first security 14 (e.g., a 10% discount). Put another way, using the 10% discount example, for every $1.00 worth of the second security 16 that an investor tenders, the investor would receive approximately $1.11 of the first security 14, based on the calculated per-share value of the shares of the first security 14 and the second security 16 over the look-back period 26.

According to various embodiments, the exchange ratio may be determined based on the arithmetic average of the daily volume-weighted average price (VWAP) of the first security 14 and/or the second security 16 over the look-back period 26. The VWAP for a particular trading day for a security may be calculated by taking the weighted average of the prices of each trade for the security for that particular trading day. In such an embodiment, a Web site or other means may be used to provide to investors updated, indicative exchange ratios based on the VWAP (or other trading data used in the formula) over the tender period 20.

Figure 3:
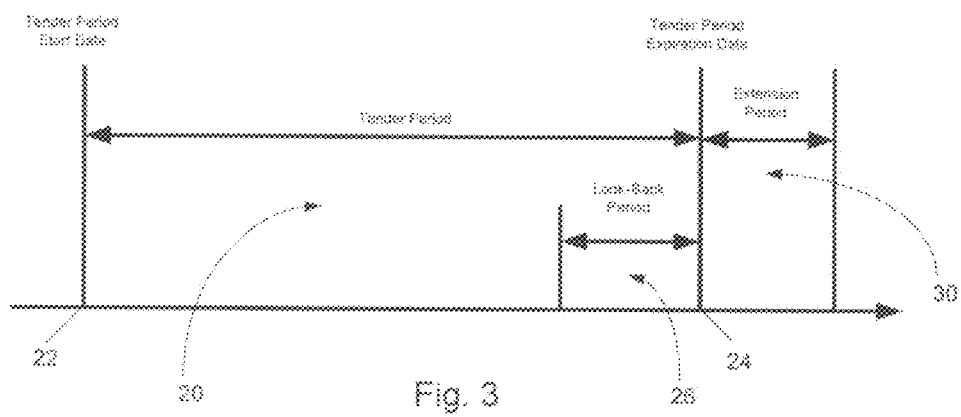
FIG. 3 is a timeline illustrating an alternative embodiment of the exchange offer according to another embodiment of the present invention.

According to various embodiments, there may be a limit on the number of units of the first security 14 that an investor 12 can receive for each unit of the second security 16 tendered, and/or a minimum number of units of the first security 14 that an investor 12 can receive for each unit of the second security 16 tendered, or both a limit and a minimum. The first party 10 may announce whether the limit on the number of units that can be received for each tendered unit is in effect at or shortly after the tender period expiration date 24 of the originally contemplated tender period 20. The first party 10 may make this announcement, for example, through a Web site and/or a press release. As shown in FIG. 3, if the limit applies, then the exchange ratio may be set based on the limit and the exchange offer may be extended for an additional period of time (the extension period 30) to permit investors 12 to tender or withdraw their units during the extension period 30. The duration of the extension period 30, which may commence after the tender period expiration date 24, may be, for example, two days or some other period of time. A limit may be used to ensure that an unusual or unexpected change in the trading price of one security used in the formula relative to the other does not result in an unduly high or low number of units of one security exchanged per unit of the other.

The first party 10 may deliver shares of the first security 14 pursuant to the exchange on a prorated basis. That is, for example, the first party 10 may only be willing to exchange a certain maximum number of shares of the first security 14. If the offer is oversubscribed (e.g., if the investors 12 tender a quantity of shares of the second security 16 that would require the first party 10 to deliver a quantity of shares of the first security 14 in excess of the imposed limit), the first party 10 may accept less shares of the second security 16 than the total that is tendered and the shares of the first security 14 may be apportioned to the investors 12 on a pro rata basis.

According to various embodiments, other variables besides or in addition to trading data may be used to establish the exchange ratio. For example, a Dutch auction may be conducted to determine shareholder preferences regarding the appropriate ratio. The Dutch auction may occur over the tender period 20 and may end at the tender period expiration date 24, at which time the closing price (or exchange ratio) may be determined (subject to possible invocation of a limit on the exchange ratio, as described above). In another embodiment, a spot price (such as the closing price at the end of the tender period) could be used in establishing the exchange ratio in such an embodiment.

In an embodiment where a Dutch auction is used, the exchange ratio may be established based on the winning bid (or "clearing price"), which is the highest bid price at which all of the securities offered by the first party 10 are exchanged. For example, if five hundred units of the first security 14 were to be exchanged, and the bids from the auction participants are as shown below in Table 1 where the bid price represents the number of units of the second security that investors 12 are willing to exchange for one unit of the first security, the exchange ratio would be 1.7 because that is the price at which 500 units are cleared.

TABLE 1

| Auction Participant | Bid Price | Quantity Sought |
|---|---|---|
| 1 | 2.0 | 100 |
| 2 | 1.9 | 200 |
| 3 | 1.8 | 100 |
| 4 | 1.7 | 100 |
| 5 | 1.6 | 300 |
| 6 | 1.5 | 100 |
| 7 | 1.4 | 200 |

According to various embodiments, the first party 10 may not be required to complete the exchange offer if certain conditions exist. One of those conditions may be that the total number of shares of the second security 16 tendered by the investors 12 is less than some minimum amount. In some embodiments, the first party 10 could have the right to waive this condition in order to complete the exchange.

Other general aspects of the present invention are directed to a method comprising exchanging units of securities as described above and underwriting such an exchange offer.

Figure 4:
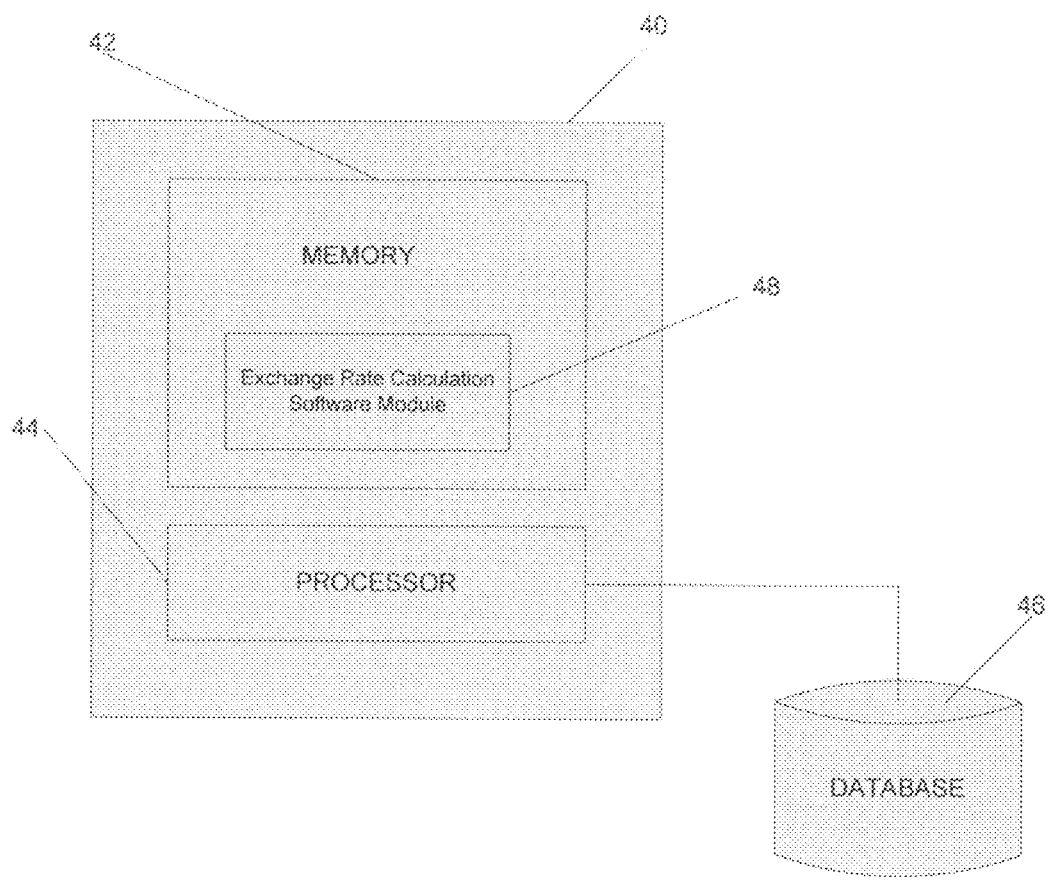
FIG. 4 depicts a computer system according to one embodiment of the present invention.

As shown in FIG. 4, a computer system 40 may be used to compute the value of the exchange ratio. The computer system 40 may include a memory 42 and a processor 44. The memory 42 may include processing instructions for controlling the processor 44. The processing instructions may be implemented as software code to be executed by the processor using any suitable computer instruction type stored in the memory 42. The software code may include an exchange rate calculation module 48, which may include programming instructions which, when executed by the processor 44 cause the processor 44 to compute the value of the exchange rate using one or more of the processes described above.

The memory 42 may be embodied as any suitable computer-readable medium such as, for example, a RAM, a ROM, magnetic media such as a hard drive or a floppy disk, or optical media such as a CD-ROM. The processor 44, when executing the processing instructions stored in the memory 42, may compute the value of the exchange rate using one or more of the processes described above based on trade data regarding the securities that is stored in a database 46. The computer system 40 could be used to calculate the value of the exchange ratio throughout the tender period based on the performance of the securities, with such data being received by data feeds, for example, and stored in the database 46. The computed value of the exchange ratio may also be stored in the memory 42 or in some other storage. The value of the exchange ratio may also be published to a Web site or some other outlet. Also, the computed value may be transmitted to another computer system via a network.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A process for determining an exchange ratio for an exchange offer, wherein according to the exchange offer, a first party is to provide, after an exchange offer period, units of a first security in exchange for units of a second security tendered by one or more second parties during the exchange offer period, wherein the exchange offer period has a start date and an expiration date, and wherein the number of units of the first security received in the exchange for the tendered units of the second security is based on the exchange ratio, the process comprising:

prior to the expiration date of the exchange offer period, establishing that the exchange ratio when determined for the exchange offer will realize a dollar parity exchange comprising delivery of a specified dollar value of the first security in exchange for a fixed dollar value of the second security;

determining, by a computer system, the exchange ratio based on both (i) first trading data for one of the first security and a proxy security for the first security, and (ii) second trading data for one of the second security and a proxy security for the second security, wherein the first trading data comprises price data for the one of the first security and the proxy security for the first security, and the second trading data comprises price data for the one of the second security and the proxy security for the second security, in each case over a look-back period comprising one or more trading days during the exchange offer period, wherein the computer system comprises a processor and a memory that includes processing instructions for controlling the processor, and wherein:

determining the exchange ratio further comprises calculating the exchange ratio such that the exchange ratio provides for every of the fixed dollar value of the second security, an exchange for the specified dollar value of the first security; and storing the exchange ratio in the computer system.

2. The process of claim 1, wherein the exchange ratio is determined on the exchange offer period expiration date.

3. The process of claim 1, wherein the exchange offer period is a tender period having a duration of at least twenty business days.

4. The process of claim 1, wherein the look-back period is over an end portion of the exchange offer period.

5. The process of claim 1, wherein the price data comprising the first trading data comprises a daily volume-weighted average price ("VWAP") and the price data comprising the second trading data comprises a daily VWAP.

6. The process of claim 1, wherein the price data comprising the first trading data is an arithmetic average of a daily volume-weighted average price ("VWAP"), and the price data comprising the second trading data is an arithmetic average of a daily VWAP, in each case over the look-back period.

7. The process of claim 6, wherein the look-back period comprises two or more trading days during the exchange offer period, the first trading data is the arithmetic average of the daily VWAP for the first security over the look-back period, and the second trading data is the arithmetic average of the daily VWAP for the second security over the look-back period.

8. The process of claim 7, further comprising calculating by the computer system and providing, by a website, indicative exchange ratios over the exchange offer period.

9. The process of claim 1, wherein there is an upper limit on the number of units of the first security that the one or more second parties can receive for a unit of the second security.

10. The process of claim 1, wherein the exchange ratio is determined near the exchange offer period expiration date.

11. The process of claim 1, wherein the look-back period comprises two or more trading days during the exchange offer period, including the exchange offer period expiration date.

12. The process of claim 1, wherein the one or more second parties comprise holders of the second security.

13. The process of claim 1, wherein the specified dollar value of the first security is greater than the fixed dollar value of the second security, whereby the established dollar parity exchange provides a discount associated with the dollar value of the first security to be exchanged relative to the dollar value of the second security to be exchanged.

14. The process of claim 1, wherein the specified dollar value of the first security is less than the fixed dollar value of the second security, whereby the established dollar parity exchange provides a premium associated with the dollar value of the first security to be exchanged relative to the dollar value of the second security to be exchanged.

15. The process of claim 1, wherein the first trading data and the second trading data are stored in a database in communication with the processor.

16. The process of claim 1, wherein the determined exchange ratio is transmitted to a computer system via a network.

17. The process of claim 1, wherein the determined exchange ratio is published to a website.

18. A computer system for determining an exchange ratio for an exchange offer, wherein, according to the exchange offer, a first party is to provide, after an exchange offer period, units of a first security in exchange for units of a second security tendered by one or more second parties during the exchange offer period, wherein the exchange offer period has a start date and an expiration date, and wherein the number of units of the first security received in the exchange for the tendered units of the second security is based on the exchange ratio, the computer system comprising:

a processor; and a memory in communication with the processor, wherein the memory stores instructions which, when executed by the processor, causes the processor to determine the exchange ratio based on both (i) first trading data for one of the first security and a proxy for the first security, and (ii) second trading data for one of the second security and a proxy for the second security, wherein the first trading data comprises price data for the one of the first security and the proxy for the first security, and the second trading data comprises price data for one of the second security and the proxy for the second security, in each case over a look-back period comprising one or more trading days during the exchange offer period, wherein the exchange ratio when determined for the exchange offer will realize a dollar parity exchange comprising delivery of a specified dollar value of the first security in exchange for a fixed dollar value of the second security, whereby the determined exchange ratio provides for every of the fixed dollar value of the second security, an exchange for the specified dollar value of the first security.

19. The computer system of claim 18, wherein the exchange ratio is determined on the exchange offer period expiration date.

20. The computer system of claim 18, wherein the exchange ratio is determined near the exchange offer period expiration date.

21. The computer system of claim 18, wherein the exchange offer period is a tender period having a duration of at least twenty business days.

22. The computer system of claim 18, wherein the look-back period is over an end portion of the exchange offer period.

23. The computer system of claim 18, wherein the look-back period comprises two or more trading days during the exchange offer period, including the exchange offer period expiration date.

24. The computer system of claim 18, wherein the price data comprising the first trading data comprises a daily volume-weighted average price ("VWAP"), and the price data comprising the second trading data comprises a daily VWAP.

25. The computer system of claim 18, wherein the prior data comprising the first trading data is an arithmetic average of a daily volume-weighted average price ("VWAP"), and the price data comprising the second trading data is an arithmetic average of a daily VWAP, in each case over the look-back period.

26. The computer system of claim 25, wherein the look-back period comprises two or more trading days during the exchange offer period, the first trading data is the arithmetic average of the daily VWAP for the first security over the look-back period, and the second trading data is the arithmetic average of the daily VWAP for the second security over the look-back period.

27. The computer system of claim 26, wherein indicative exchange ratios calculated by the computer system are provided by a website over the exchange offer period.

28. The computer system of claim 18, wherein the specified dollar value of the first security is greater than the fixed dollar value of the second security, whereby the established dollar parity exchange provides a discount associated with the dollar value of the first security to be exchanged relative to the dollar value of the second security to be exchanged.

29. The computer system of claim 18, wherein the specified dollar value of the first security is less than the fixed dollar value of the second security, whereby the established dollar parity exchange provides a premium associated with the dollar value of the first security to be exchanged relative to the dollar value of the second security to be exchanged.

30. The computer system of claim 18, wherein there is an upper limit on the number of units of the first security that the one or more second parties can receive for a unit of the second security.

31. The computer system of claim 18, wherein the one or more second parties comprise holders of the second security.

32. The computer system of claim 18, wherein the first trading data and the second trading data are stored in a database in communication with the processor.

33. The computer system of claim 18, wherein the determined exchange ratio is transmitted to a computer system via a network.

34. The computer system of claim 18, wherein the determined exchange ratio is published to a website.

* * * * *